United States Patent [19]
Emplit

[11] Patent Number: 4,590,575
[45] Date of Patent: May 20, 1986

[54] DIELECTRIC COMPENSATED LEVEL CONTROL SYSTEM FOR USE IN TANKS CONTAINING SUBSTANCE

[75] Inventor: Raymond H. Emplit, Glen Mills, Pa.

[73] Assignee: Robertshaw Controls Company, Richmond, Va.

[21] Appl. No.: 537,641

[22] Filed: Sep. 30, 1983

Related U.S. Application Data

[63] Continuation-in-part of Ser. No. 330,865, Dec. 15, 1981, abandoned.

[51] Int. Cl.$^4$ ............................................. G01F 23/26
[52] U.S. Cl. .................................... 364/509; 73/304 C; 364/562
[58] Field of Search ................... 73/290 R, 304 C; 340/612, 618, 620; 361/284; 364/509, 562

[56] References Cited

U.S. PATENT DOCUMENTS

| | | | |
|---|---|---|---|
| 4,083,248 | 4/1978 | Maier | 73/304 C |
| 4,199,984 | 4/1980 | Huddart et al. | 73/304 C |
| 4,275,382 | 6/1981 | Jannotta | 364/509 X |
| 4,383,444 | 5/1983 | Beaman et al. | 73/304 C |
| 4,485,673 | 12/1984 | Stern | 73/304 C |

Primary Examiner—Errol A. Krass
Assistant Examiner—Edward R. Cosimano
Attorney, Agent, or Firm—Ratner & Prestia

[57] ABSTRACT

A dielectric compensated level indicator control system including a microprocessor that controls the height and therefore the amount of a substance, such as fluid or granular solid, to be contained in a closed or open tank or vessel. The system has a measurement probe whose capacitance is a function of the level of substance in the tank and a reference probe whose capacitance is a function only of the dielectric constant of the substance. The appropriate zero capacitance is subtracted from each probe capacitance and a ratio between the resulting difference capacitances is determined. This ratio is independent of the dielectric constant of the substance and represents the percent fullness of the tank. When substances with different dielectric constants are placed in the vessel no span recalibration of the probe is required. A single transmitter is used to transmit along a single transmission channel a single signal which represents the capacitance of both probes. When received, this signal is separated into two time interval signals, one representing each probe.

10 Claims, 7 Drawing Figures

DIELECTRIC COMPENSATED LEVEL CONTROL SYSTEM FOR USE IN TANKS CONTAINING SUBSTANCE

This application is a continuation-in-part of application Ser. No. 330,865 filed Dec. 15, 1981 now abandoned.

BACKGROUND OF THE INVENTION

A. Field of the Invention

This invention relates to the field of art of dielectric compensated level indicator control systems using capacitance measurement and reference probes for indication and control of substance level in a tank.

B. Background Art

It is well known that the level of a substance, i.e. a fluid or granular solid, in an open or closed tank or vessel can be measured and controlled by many fundamentally similar methods. Measurement and control is usually based on the concept that the change in fluid level in the tank is equivalent to displacing the top surface of the fluid.

In an earlier method of measurement and control, floats were used to detect and regulate the fluid level in a container. The method employs direct-actuated types of liquid level detectors and is applicable to open tanks or vessels which are subject to atmospheric pressure. However, when using closed tanks, water level is detected in a system under pressure. An arrangement used for this purpose includes one valve position at the lowest fluid level in the tank. Periodic opening of these valves will establish the presence of either steam or water at each valve permitting an inference to be drawn concerning the actual water level in the tank.

A prior computer-based control system used well known signal aquisition input instrumentation to obtain analog signals from sensors and transducers, such as capacitance probes, in the tank and transmits them to the computer. To close the fluid level control loop, D/A converters may be used to transmit the signals used to drive on/off fluid level controllers and actuators. Devices such as relays or stepper motors for opening or closing pneumatic fluid valves are also provided control signals from the computer along digital output channels for controlling the fluid flow into and out of the tank. The processor may, for example, compare the input signals from the fluid level transducers with upper and lower set point limits in order to control, in on/off, proportional, integral or differential modes, the fluid flow to the tank to maintain the desired liquid level within a predetermined range. Alarm monitoring and faulty transducer detection can also be performed by the computer.

Analog controllers may be used without a computer processor for controlling the level of fluid in the tank. The analog controller may either use its own set point reference voltage to control fluid input to the tank or it may accept fluid level set point limits from a central processor for the same purpose. Output devices such as strip chart recorders using properly scaled paper, calibrated meters with d'Arsonval movement and digital displays have all been used to show the amount and height of fluid in tanks.

Capacitance probes are commonly used to detect fluid levels in tanks. Systems employing these probes operate on the principle that the capacitance between two plates varies as the dielectric constant of the substance between the plates varies. Air has a dielectric constant of one and the substances measured by these systems have dielectric constants greater than one. If a probe is extended into a tank, the probe will serve as one plate of the capacitor and the tank will serve as the other plate. As various levels of substance are stored in the tank, varying regions between the probe and the tank will be filled with the substance and varying regions will be filled with air. This will cause the capacitance between the probe and the tank to vary as a function of the level of substance. Capacitance readings of the probe can therefore be scaled to indicate substance level.

Once such a system has been calibrated, the readings obtained are accurate only as long as the dielectric constant of the substance does not vary. If a different substance is stored in the tank or if temperature or humidity alter the dielectric constant of the substance in the tank, the system must be recalibrated. In order to solve this problem, a second probe has been placed in the tank in a position in which it will always be completely submerged by the substance. The capacitance reading of this probe therefore has been a function only of the dielectric constant of the material. However this method had required two transmitters, one to transmit the capacitance information from each of the probes, and two transmission channels, one for each transmitter.

When the capacitance information from the two probes has been processed by the control system an appropriate zero capacitance must be subtracted from each probe capacitance. The results for each capacitance must then be separately scaled. This has been done to make certain that the entire span of the output of the probes has been utilized in order to obtain accurate results. These two signals have been then divided into each other in a manner which caused the effects of the dielectric constant of the material to cancel out, causing the resulting ratio to be a measure of the level of substance which is independent of the dielectric constant of the substance.

Furthermore, the probes themselves must be recalibrated when substances with widely varying dielectric constants have been stored in the same container. The probes normally have an analog output span of 4 to 20 milliamps. A probe may therefore be calibrated to emit 4 milliamps when the container is empty and 20 milliamps when the container is full for some dielectric $K_1$. If a substance with a dielectric constant of twice $K_1$ is subsequently placed within the vessel the capacitance which resulted in 20 milliamps output would be achieved when the tank was 50% full. Recalibration of the control means can interpret this capacitance as 50% but measurements between 50% and 100% of the tank capacity would be beyond the span of the probe. To remedy this it has been necessary to adjust potentiometers within the probe head. The probe heads are located at the vessel, and adjusting the potentiometer often involves climbing the tank. The probe span recalibration is time consuming and inconvenient. Similarly, if a substance with a dielectric constant of one-half $K_1$ is subsequently placed in the vessel the full range of the tank, 0% to 100%, would only occupy one-half the span of the probe output, 4 to 12 milliamps. Recalibration of the probe span at the probe head would be required to achieve the full range and accuracy of the probe.

SUMMARY OF THE INVENTION

An on-line dielectric compensated level indicator control system is used for automatically calibrating high and low set point levels of substances such as fluids or solids in shaped containers. Two probes, a measurement probe and a reference probe are positioned within the tank whose substance level is to be measured. Each probe is coupled to a multivibrator whose output frequencies are a function of the capacitance between the respective probe and the tank. The output signals of the two multivibrator circuits are coupled to logic and switching circuits which produce a single signal containing information about the capacitance of both probes. This signal is transmitted by a single transmitter along a single transmission channel. When received, this signal is separated into its two component signals and two time interval signals are produced each representing the capacitance of its respective capacitance probe. Since these time interval signals can be as long or short as necessary all possible variations in substance dielectric constants can be accommodated without any probe output span recalibration. From each of time interval signals a zero capacitance signal is subtracted producing two difference signals. The ratio of the difference is then determined. This ratio represents the level of substance in the tank.

Therefore it is an object of this invention to provide on-line dielectric compensated measurement of substance levels without recalibrating probe capacitance output signals for large variations in substance dielectric constants.

It is an additional object of this invention to provide on-line measurement of substance levels in systems employing both a measurement probe and a reference probe using a sole transmitter and a single transmission line to transmit the information from the tank regarding both probes.

DETAILED DESCRIPTION OF THE INVENTION

Figure 1:
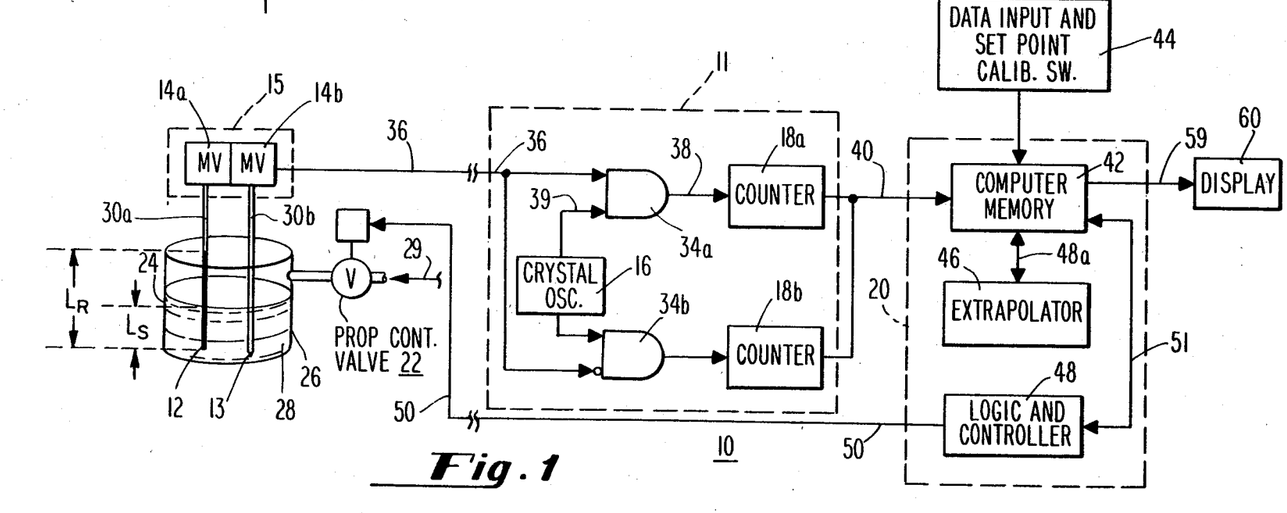
FIG. 1 is a circuit diagram of the dielectric compensated level indicator control system of the invention.

As shown in FIG. 1 dielectric compensated level indicator control system 10 has a measurement capacitance probe 12, capacitance reference probe 13, transmitter 15, separator unit 11 and a control system. Separator unit 11 includes crystal coupled oscillator 16, AND gates 34a,b and counters 18a,b, while the control system comprises microprocessor 20, manual data input and set point calibration switches 44 and flow control valve assembly circuit 22.

Measurement probe 12 is positioned within a shaped container such as tank 24. Probe 12 has a total length $L_R$ of which a length $L_S$ is submerged beneath the surface of substance 28. In addition, the probe which may be substantially in the shape of a cylinder or plate, forms a capacitor with tank wall 26. As the substance 28, i.e., fluid or granular solid, fills tank 24, the capacitance between probe 12 and wall 26 changes since the varying amount of substance alters the dielectric properties of the space between one capacitor element, probe 12, and the other capacitor element, tank wall 26. Over time, the amount of substance that is initially in the tank will not remain constant and therefore the capacitance between probe 12 and the wall, the measurement probe capacitance $C_M$, will vary as a level of substance in the tank varies. Probe 12 produces an input signal along line 30a to transmitter 15 which is a function of the change in measurement probe capacitance. Measurement probe capacitance is a function of the amount of probe submerged by the substance or the distance between a plate type probe and the surface of the substance below it.

Reference probe 13 is completely submerged below the surface of substance 28. Probe 13 is substantially the same shape as probe 12, but has a shorter length $L_R$. Reference probe 13 also forms a capacitor with tank wall 26. Because reference probe 13 is completely submerged at all times, its capacitance is constant. A reference signal which is a function only of the dielectric constant K of substance 28 is thus produced by reference probe 13 and is coupled along line 30b to transmitter 15. The reference signal produced by reference probe 13 is used, along with the signal from probe 12, to make a determination of substance level which is independent of the dielectric constant of substance 28.

The signals produced by probes 12, 13 are coupled to a single transmitter 15. Transmitter 15 includes two multivibrators 14a,b which change their output frequency as a function of the change in probe capacitance as provided from probes 12 and 13 along lines 30a,b. Transmitter 15 also includes logic for switching the two frequencies in an alternating manner onto a single transmission channel 36. The ability to create a single signal from the output of the two probes allows system 10 to measure and control substance levels using fewer wires between the container and a remote control station. The cables which are used as transmission lines in this application must be high quality lines which must be well protected under adverse conditions. Often they must extend over large distances to connect containers to their remote control systems. Thus a great deal of expense can be avoided by transmitting the information from both probes over a single channel. Transmitter 15, seen in detail in FIG. 6, may be mounted in a probe head from which probes 12, 13 extend.

The signal transmitted by transmitter 15 contains pulses whose time duration varies as a function of probe capacitance. These pulses may be as long or as short as necessary in order to accommodate any possible substance dielectric constant. This effectively causes the probe spans (as previously described) to be unlimited since the capacitance is proportional to the duration of the pulses rather than a limited analog current level. When capacitance is proportional to analog current level a large increase in dielectric constant, and hence capacitance, may require a current level outside the span of the probe. If the dielectric constant is greatly decreased it may result in a small portion of the probe span being utilized. In either case the probe span must be recalibrated requiring a trip to vessel and often climbing on the vessel to adjust potentiometers such that the range of capacitance produced by varying levels of substance corresponds to the probe output span. By making the capacitance proportional to the duration of pulses, system 10 produces signals which may vary as necessary to represent any range of dielectric constants since the pulses may be as wide or as narrow as required. Thus once the probe spans are calibrated they do not have to be calibrated again no matter how different the dielectric constant may be for a different substance subsequently stored in the container.

Figure 2:
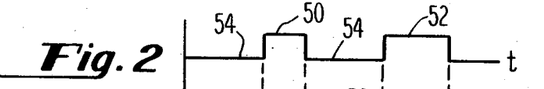
FIG. 2 shows the output waveform of the transmitter illustrated in FIG. 1.

FIG. 2 shows the inverted output of transmitter 15. Low level waveform segments 54 correspond to the frequency of multivibrator 14b and thereby the capacitance of reference probe 13. It can be seen that waveform segments 54 are of equal duration. Waveform segments 54 are of equal duration because reference probe 13 is designed to be entirely submerged at all times, resulting in a constant capacitance and a constant output frequency from multivibrator 14b.

Figure 3:
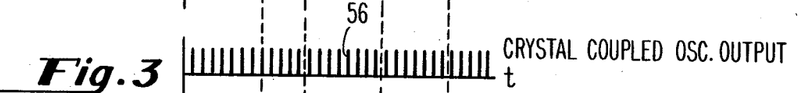
FIG. 3 shows the output of the crystal coupled oscillator illustrated in FIG. 1.
Figure 4:
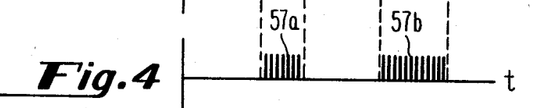
FIG. 4 shows the output signals of an AND gate illustrated in FIG. 1.

High level waveform segments 50 and 52 correspond to the output of multivibrator 14a and thereby the capacitance of measurement probe 12. Pulses 56 of FIG. 3 are generated by crystal oscillator 16 and are gated through AND gate 34a by segments 50 and 52. The output of AND gate 34a can be seen in FIG. 4. These output pulses are coupled to counter 18a by line 38. Counter 18a will count pulses 57a of FIG. 4 and produce a time interval signal representing the duration of segment 50 of FIG. 2. Likewise counter 18a will count pulses 57b of FIG. 4 and produce a time interval signal representative of segment 52 of FIG. 2.

Thus, the waveform shown in FIG. 2 contains information on the measurement probe signal in the duration of the segments during which the waveform is high. These segments are a function of the capacitance of measurement probe 12. The duration of these segments is used by counter 18a to produce for microprocessor 20 an input representative of the capacitance of measurement probe 12 and thereby the level of substance in tank 14. In a similar fashion, counter 18b produces a time interval signal related to the duration of wave form segments 54. Pulses from crystal oscillator 16 are gated through AND gate 34b by segments 54, and counted by 18b.

In this embodiment, the measurement probe time interval signal, which is a function of the duration or width of the waveform segment associated with multivibrator 14a, is calibrated to represent the percentage of the tank that contains substance. Specifically, waveform segment 50 has a measurement probe time interval signal that is representative of the measurement probe capacitance $C_M$ and represents, for this example, that 35% of the tank is filled with the fluid or granular solid. Another longer segment 52 has a time interval signal which may indicate that the tank is 45% filled. Furthermore, since each measurement probe time interval signal represents the percentage of the tank that contains substance and since the contents of the tank will be filling and emptying due to the conditions imposed on its use, it becomes important to know in certain situations how high the fluid level is at any given moment in terms of percentage of the tank that contains fluid as well as whether the fluid has exceeded a particular level or not.

To accomplish this task, two known measurement probe time interval signals are provided. One represents the point at which the tank is substantially filled with fluid, a high set point limit, and one represents the point at which the tank is substantially empty of fluid, a low setpoint limit. A scale of percentages about these two limits is produced where the scale is calibrated to represent the percent fullness of the tank at any given time about the limits set by the two high and low setpoints. Each scale has elements that represent the fullness of the container as measured from the bottom of the container to a point on the container identified by a scale element. This allows measurement of the level of fluid in a tank and control of the level of fluid. The scale is calibrated in terms of percent of tank filled and each value of the scale is a function of measurement probe 12 capacitance.

Probes 12, 13 may be installed in an angular position suitable for the size and shape of any tank. Probes installed from the side of the tank should be angled downward to allow the fluid or granular solid to drain or slide off the probe. An adjustable time delay may be included to eliminate spurious operation of system 10 due to splashing or agitation of fluid in the tank. In FIG. 1, probes 12, 13 are positioned vertically in cylindrically shaped tank 24. Changing the level condition of substance 28 will change the capacitance between measurement probe 12 and the tank wall. Since this capacitance is transmitted to multivibrator 14a by way of a signal along line 30a the frequency with which multivibrator 14a pulses is controlled by the capacitance signal transmitted to it from measurement probe 12. The frequency of the output signal from multivibrator 14a will vary as a function of the probe capacitance.

As previously described, crystal oscillator 16 provides clock pulses along line 39 to gate 34a. Transmitter 15 output signal waveforms are also provided as input to gate 34a along line 36. Gate 34a produces, by logical conjunction of the clock pulses with the transmitter output waveforms, gated output signals along line 38 which are provided to counter 18a. Counter 18a produces a signal that substantially represents the width of each of the segments produced by the multivibrator 14a. The digital signals produced by counter 18a are provided to a predetermined location and microprocessor memory 42 at line 40. The counter output may represent a desired low or high fluid level setpoint signal, representing the percentage of the tank that contains fluid at substantially that moment, which is to remain in memory indefinitely. Similarly, the output of counter 18b is provided to microprocessor 20 and stored in a location in memory 42.

The first counter output stored in computer memory 42 represents the capacitance between measurement probe 12 and the tank 24. However the capacitance measured is a function of the dielectric constant of the substance contained in tank 24. Thus, the entire calibration process must be performed again if there are changes in the dielectric constant of the substance stored in the tank unless the output of reference probe 13 is considered. Using the output of reference probe 13 it is possible to determine the substance level completely independently of the dielectric constant of the substance.

In order to make this determination, a ratio is calculated between the capacitance of the reference probe and the capacitance of the measurement probe. This ratio is developed in the following manner. First it must be noted that the capacitance of the measurement probe $C_M$, when there is nothing but air in the tank can be expressed as, $$C_{M(AIR)} = kL, \tag{1}$$

where L is the length of the measurement probe 12 and k is a constant related to the area of the plates of the capacitor and the distance between them. The quantity k may be considered constant since neither the probe or the tank is changing side or moving. There is no expression for a dielectric constant in (1) because the dielectric constant of air is 1. The capacitance represented in (1) is known as the zero capacitance.

The capacitance of measurement probe 12 when it is totally submerged is, $$C_{M(SUB)} = kKL \qquad (2)$$

where K is the dielectric constant of the substance stored in tank 24. When measurement probe 12 is partially submerged, its total capacitance may be expressed as, $$C_M = kKL_S + k(L - L_S). \qquad (3)$$

The first term on the righthand side of (3) represents the capacitance of the portion of probe 12 which is submerged. It is derived from (2) where $L_S$ is substituted for L. $L_S$ is the length of measurement probe 12 which is submerged in substance 28. The second term on the righthand side of (3) is derived from (1) where the quantity $L - L_S$ is the length of measurement probe 12 which is above the surface of substance 28. The reepresentation (3) of the total capacitance of probe 12 may be rearranged as follows:

$$\begin{aligned} C_M &= kL_S + kL - kL_S & (4) \\ &= kL + kL_S(K - 1). & (5) \end{aligned}$$

The first term on the righthand side of (5) corresponds to the zero capacitance seen in (1). In conventional measurement and control systems and methods, this term is zeroed out by means of potentiometers. However the use of a computer allows this quantity to be substracted out by means of digital computer programming. The result when this subtraction is performed is $$DELTA C_M = kL_S(K-1). \qquad (6)$$

This is the capacitance measure of interest which is obtained from measurement probe 12.

A similar derivation is necessary for reference probe 13. When tank 24 is empty, the capacitance of reference probe 13 is $$C_{R(AIR)} = kL_R, \qquad (7)$$

where $L_R$ is the length of reference probe 13. As in the case of (1) k is a constant representing the area of the plates of the capacitor and the distance between them. The geometry of reference probe 13 is picked such that the value of k is equal to the value of k for measurement probe 12. The dielectric constant K does not appear in (7) since the dielectric constant for air is 1.

The capacitance of reference probe 13 when submerged is $$C_{R(SUB)} = kKL_R \qquad (8)$$

where K is the dielectric constant of the substance in the tank. Substracting (7) from (8) yields $$DELTA C_R = kL_R(K-1). \qquad (9)$$

Taking the ratio R of the capacitance of measurement probe 12 seen in (6) to the capacitance of reference probe 13 seen in (9) yields:

$$\begin{aligned} R &= \frac{DELTA\ C_M}{DELTA\ C_R} & (10) \\ &= \frac{kL_S(K-1)}{kL_R(K-1)} & (11) \\ &= \frac{L_S}{L_R}. & (12) \end{aligned}$$

Since $L_R$ represents the constant length of the reference probe, R is therefore a function only of $L_S$ which is the length of the measurement probe submerged. R therefore represents the level of substance in the tank. At this point, the desired scaling of R into engineering units of measurement or percent fullness is performed.

In microprocessor 20 the ratio of (12) is derived from the respective time interval signals of the measurement probe and the reference probe. If a substance with a dielectric constant which is very large with respect to a previous dielectric constant is placed in the container both the reference probe and measurement probe time interval signals will increase proportionally. These time interval signals can increase many orders of magnitude without exceeding the capacity of counters 18a,b to measure them. This effectively removes any constraints imposed by the span of the output of the probes in conventional systems.

Manual data input and setpoint calibration switches 44 are provided for the purpose of entering relative input parameters and storing the low and high fluid level signals in memory 42 of microprocessor 20. The calibration switches provide for fluid level signals to be stored in memory. These signals represent the operation measurement of substantially any liquid level in the tank in terms of percent of fullness of the tank on a scale from 0% to 100%. Nonlinear conversion of the level signals to units of volume or flow rate and open channel flow systems may be obtained through suitable, well known, microprocessor based linearization means regardless of the shape of the tank. The low fluid level set point signal may not necessarily represent the fluid level in the tank when it is completely empty and the high fluid level signal may not necessarily represent the fluid level in the tank when it is completely full. The set points are automatically calibrated in terms of the percent of fluid in tank 24.

The high and low set points in memory 42 are provided to extrapolator 46 along data line 48a. Extrapolator 46 uses both the high level set point which may represent the tank fluid level other than 100% full, and low level set point which may represent the tank fluid level at a point other than when the tank is empty. Extrapolator 46 will then produce the proper range of percentages of fullness of the tank and the range between empty (0%) and full (100%) after operating on the two low and high set points obtained from memory 42.

Extrapolator 46 and microprocessor 20 not only produce a scale having the range of fluid levels in the tank in terms of the percentage of fullness of the tank but may also provide the volume of fluid in the tank at virtually any moment during its use. Fluid rate flow may also be determined in open channel systems. Extrapolator 46 may, by way of a table look-up feature, determine fluid levels in oddly shaped containers and compensated for nonlinearities of probe configurations due to tanks of different geometries.

System 10 provides a level control mode of operation by comparing in logic and controller section 48 the actual fluid level or volume in the tank with either the higher or lower setpoint values provided to the section along line 51 from memory 42. For example, if overfilling a tank is to be avoided and the actual fluid level exceeds the high limit setpoint in memory 42 then a signal is provided from controller 48 along line 50 to proportional control valve 22, which may also include a stepper motor or a similarly functioning device, to stop the flow of fluid through line 29 into tank 24. Control relays may also be used to control fluid flow into and out of the tank. If on the other hand, an empty condition cannot be tolerated and the actual fluid level is below low limit set point in memory 42, a signal is provided along line 50 to proportional control valve 22 to allow more fluid to flow into tank 24.

Figure 5A:
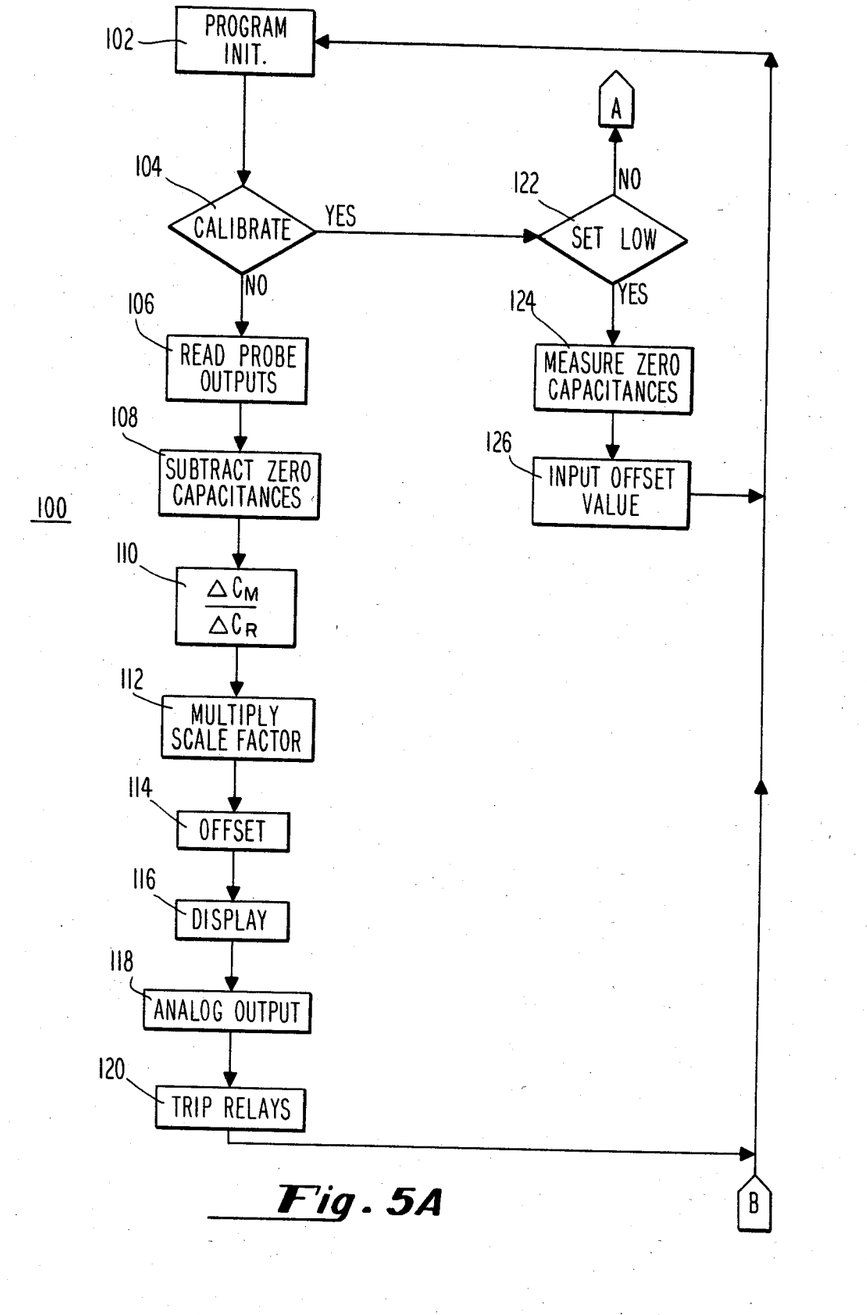
FIGS. 5A-B illustrates a flow chart of the computer program which implements the control system shown in FIG. 1.
Figure 5B:
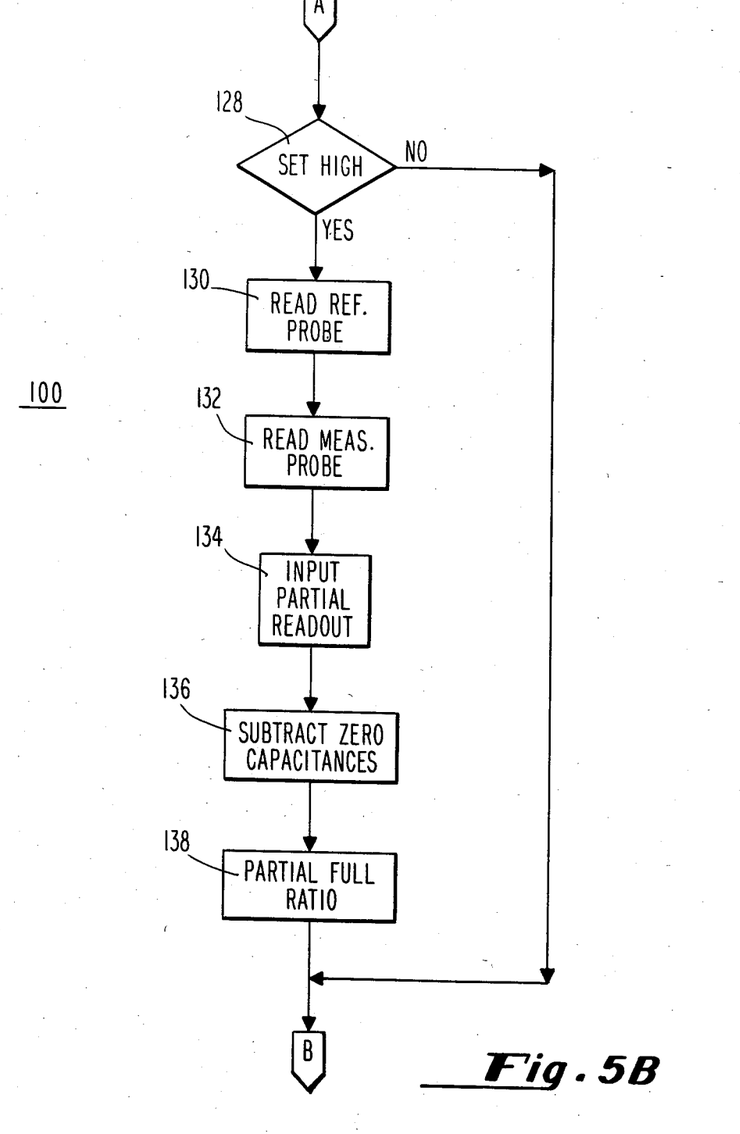

The functions involved in calibrating the span of the capacitance probes are shown in flow chart 100 of FIGS. 5a-b. Flow chart 100 describes the sequence of events that occur during the execution of the program a copy of which is enclosed and made a part hereof written in machine language for the 1802 microprocessor. The program first initialization memory locations by defining them and providing them with initial values. This is performed at the program initialization step 102.

In decision diamond 104 a determination is made whether the system is in the calibrate mode. During normal operation of the system the NO path to block 106 is taken. In this block the time interval signals from counters 18a,b are received from separator 11 of FIG. 1. These signals are counts of the number of pulses produced by crystal oscillator 16 during the time that the signals from measurement probe 12 and reference probe 32 are transmitted along transmission line 36. The count received from counter 18a corresponding to the signal gated through AND gate 34a for the measurement probe, and the signal received from counter 18b corresponds to the signal gated through AND gate 34b for the reference probe. In block 108 respective zero capacitance are subtracted from each of the measured capacitance of the probes. In the case of the capacitance of the measurement probe, this operation corresponds to the one whose result is shown in (6). In the case of the reference probe it corresponds to the one which resulted in the expression shown in (9). In block 110 the ratio of the resulting measurement capacitance to the resulting reference capacitance is developed. It is in this operation that the dielectric of the substance is compensated for. This can be seen in (10)-(12). In block 112 the ratio which results from block 110 is multiplied by a scale factor. This may be used to convert the ratio to desired engineering units or percent fullness of the tank.

In block 114 an offset is added to the result of block 112. This is done merely to develop a desired form of output for display in block 116 or analog output in block 118. The display is sent along line 59 to display 60 of FIG. 1. The analog output is transmitted along line 50 to control valve 22 if level control is desired. If control requires relays to be tripped this is performed in block 120. From block 120 execution passes to the beginning of the program as seen in FIG. 5A. This loop described from decision diamond 104 to block 120 is the loop normally executed during normal operation.

If calibration is being performed on system 10 the answer in decision diamond 104 is YES and execution proceeds to decision diamond 122. In order to perform this calibration, a calibration switch in block 44, FIG. 1 is put into the calibrate position. Block 44 also contains a switch to set a high substance level and a switch to set a low substance level. While the tank is empty, the low switch is thrown and when the tank is full the high switch is thrown. Decision diamond 122 determines whether the low switch has been thrown. If the answer is YES readings from counters 18a and 18b are taken along line 40 in block 124. These readings correspond to the zero capacitance of the two probes. These values are stored in memory. If an offset is desired, the value of offset is read in block 126. This is the offset added in block 114. Execution then proceeds to the beginning of the program. If the low switch has not been thrown as determined by decision diamond 122 execution proceeds to decision diamond 128. If the high switch has not been thrown execution proceeds to the beginning of the program, through the YES path of decision diamond 104 and the NO path of 122 back to decision diamond 128. This is an idling loop which is executed while the system is in the calibrate mode but neither the high nor the low switches have been thrown.

When the tank is filled the high switch is set and a measurement is made of the capacitance of the reference probe in block 130, and a measurement is made of the measurement probe capacitance in block 132. Both probes are completely submerged when these readings are taken. The probe readings are taken the same way as in blocks 106 and 124, time interval signals are read from counters 18a,b through line 40 of FIG. 1. The operation in block 134 allows the calibration to be performed without completely filling the tank. If it is desired that the calibration be performed with the tank 75% full, the 0.75 is entered in block 134. The offset value read in block 126 is subtracted from this 0.75, entered in block 134 and the result is used as the scaling factor of block 112. In block 136 the zero capacitance for each probe is subtracted from the respective capacitance values obtained in blocks 130 and 132. In block 138 the ratio of the difference capacitance which resulted in block 136 is determined in the same fashion as described for blocks 108 and 110.

Figure 6:
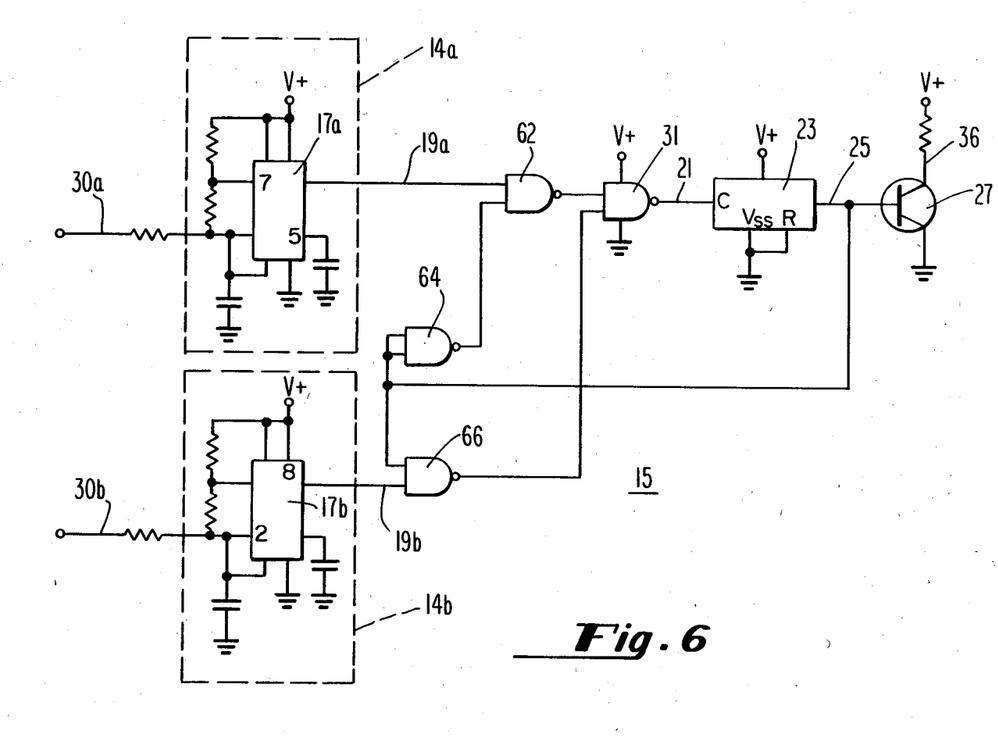
FIG. 6 shows the circuit diagram of the transmitter shown in FIG. 1.

Referring to FIG. 6, transmitter 15 may be seen in detail. Astable or multivibrator 14a includes a conventional integrated circuit timer chip 17a coupled to various resistors and capacitors in a conventional manner. Timer chip 17a produces an output frequency on-line 19a which is a function of the values of the resistors and capacitors shown, as well as the capacitance of measurement probe 12 which is connected to multivibrator 14a by line 30a. As the level of substance 28 in tank 24 of FIG. 1 increases, the capacitance of probe 12 changes, thereby changing the amount of capacitance coupled to timer chip 17a and varying the output of multivibrator 14a.

Similarly, astable multivibrator 14b is shown in FIG. 6. Multivibrator 14b contains a conventional integrated circuit timer chip 17b coupled to its various resistors and capacitors and also coupled to reference probe 13 by line 30b. The dielectric constant K of substance 28 will cause a certain capacitance to be coupled by line 30b to timer chip 17b, causing a certain output frequency to appear at output line 19b. Since reference probe 13 is designed to be constantly submerged, the output of multivibrator 14b, seen at output line 19b remains constant as the substance level varies. If a different substance is subsequently stored in tank 24 and if this substance has a different dielectric constant, then a different output frequency will be observed at 19b.

NAND gate 31 switches onto line 21 either the output of multivibrator 14a, found on line 19a, or the output of multivibrator 14b found on output line 19b. Line 21 is coupled to ripple carry binary counter 23. When line 25 is high the output of multivibrator 14b is gated through gate 66 and applied to the input of gate 31. The inputs of gate 64 are both high causing the output of gate 64 to be low. Since the output of gate 64 is applied to gate 62 the output of gate 62 is caused to stay high thus causing the output of multivibrator 14a to be blocked. The opposite result is obtained when line 25 is low.

Counter 23 counts the number of input pulses on line 21 and when a predetermined number of pulses has been counted, inverts the binary state of its output line 25. The output of counter 23, which appears on line 25, is then fed back to control whether the output of multivibrator 14a or the output of multivibrator 14b is gated through NAND gate 31. Thus, if line 25 has a 0 on it, the output of multivibrator 14a will be counted by counter 23. When the predetermined number of counts has been obtained, the output will change to a 1. The higher the frequency output of multivibrator 14a, the sooner counter 23 reaches its predetermined number of counts and the shorter duration of the 0 state output. Thus the duration of the 0 state output is dependant on the output frequency of multivibrator 14a and thereby on the capacitance measured by probe 12. Similarly, when the output of counter 23 is a 1, the frequency of multivibrator 14b is counted.

When output line 25 switches to 1, the output of multivibrator 14b is gated through NAND gate 31. Again, the higher the frequency of the output of multivibrator 14b, the sooner counter 23 counts the predetermined number of pulses and switches its output back to the 0 state. Thus, the duration of the 1 state at the output of counter 23 is determined by the capacitance of reference probe 13. Line 25 drives transistor 27, the output of which is coupled to transmission channel 36 of FIG. 1. The signal on transmission channel 36 is the output of transmitter 15. This single signal thus alternately represents the frequency of multivibrator 14a and the frequency of multivibrator 14b, thereby representing the capacitance of measurement probe 12 and reference probe 13. The frequency with which this signal alternates from one multivibrator to the other is normally in the range of 10–100 Hertz.

Display 60 may be used to accept a digital signal along line 59 within a range of from 0–100% for example, to show the analog representation of the fullness of the tank in terms of percent fullness based on the range of the scale provided in extrapolator 46. Once the probe and transmitter are installed in a tank, the two high/low setpoints stored in computer memory, the level control system will operate without further probe adjustment. This is especially important when the probe and the transmitter are used in explosion-proof installations. The probe/transmitter is, itself, explosion-proof due primarily to its low energy use. Calibrations are required as the system is moved from one shaped tank to a different shaped tank although not if the same tank is used.

In compensated level indicator system 10 the following components have been used for the operation and function as described and shown.

| Reference Number | Component |
| --- | --- |
| 14a,b | 7555 |
| 16 | 7209 |
| 18a,b | 4022 |
| 20 | 1802 |
| 23 | 4020 |

APPENDIX

Machine Language Code For 1802
RCA Microprocessor

```
$A000,

FF FF E1 06 FE CB 11 00 D2 14 19 C3 03 CB F8 0B

A6 F8 20 B6 9D 56 16 8D 56 26 D2 12 00 D2 06 D1

D2 14 00 C3 03 CB F8 0B A6 F8 20 B6 9E 56 16 8E 56 26 D2 12 00 F8 0B A6 F8 20 B6 97 56 16 87 56

26 C0 15 00 D2 13 00 C3 03 D0 D2 06 D1 F8 0B A6

F8 20 B6 99 56 16 89 56 26 9A B7 8A A7 D2 04 F6

C3 03 D0 D2 05 89 20 0B D2 07 09 D2 05 14 20 0B

C4 C4 C4 F8 0B A6 F8 20 B6 9F 56 16 8F 56 26 D2

$A080,

05 B7 C3 03 D0 D2 05 89 20 0B 99 B7 89 A7 D2 05

66 20 0B C3 03 D0 C0 01 DF FF FF FF FF FF FF FF
```

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF $A100,

E0 69 FE C3 00 00 62 08 36 0E 3C 00 30 5C 3E 00

62 00 E1 D2 14 19 C3 03 CB 97 BD 87 AD D2 14 00

C3 03 CB 97 BE 87 AE D2 04 6E 20 1C 20 13 01 D2

07 23 20 13 05 97 B9 87 A9 D2 04 6E 20 1C 20 13

00 D2 07 23 20 13 05 97 BB 87 AB 99 B7 89 A7 D2

07 8E 20 13 05 D2 04 42 20 13 30 00 3C 00 62 00

E1 D2 14 19 C3 03 CB F8 0B A6 F8 20 B6 9D 56 16

8D 56 26 D2 12 00 D2 06 D1 D2 14 00 C3 03 CB F8

0B A6 F8 20 B6 9E 56 16 8E 56 26 D2 12 00 F8 0B

A6 F8 20 B6 97 56 16 87 56 26 C0 15 10 D2 13 00

C3 03 D0 97 BF 87 AF D2 04 6E 20 18 20 13 01 D2

07 23 20 13 05 97 BA 87 AA D2 04 6E 20 18 20 13

00 D2 07 23 20 13 05 97 BC 87 AC 9A B7 8A A7 D2

07 8E 20 13 05 D2 04 42 20 13 30 00 FF FF FF FF

FF FF FF FF FF FF FF FF FF FF FF FF FF FF FF FF

FF FF FF FF FF FF FF FF FF FF FF FF FF FF FF FF $A200,

97 F6 F6 F6 F6 F6 51 06 F6 F6 F6 F6 F6 F5 FE F6

33 31 A5 97 FA 1F B7 06 FA 1F 56 85 32 29 25 06

F6 56 16 06 76 56 26 30 1B 21 D2 04 F6 97 FE 3B

35 F8 00 B7 A7 11 01 FE FE FE FE FE 51 97 F4 B7

D3 FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF $A280,

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF $A300,

F8 00 B8 A8 06 F6 F6 F6 F6 F6 51 E1 97 F6 F6 F6

F6 F6 F7 FC 0A A5 97 FA 1F B7 06 FA 1F 56 85 C2

1E FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF $A380,

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF $A400,

F8 00 B7 A7 3D 14 C4 C4 3D 14 C4 C4 3D 14 17 97

FE 3B 04 D3 E0 67 01 30 30 F8 00 B7 A7 3D 2D C4

C4 3D 2D C4 C4 3D 2D 17 97 FE 3B 1D D3 E0 67 03

6F A7 6F B7 6F A8 6F B8 67 00 E1 32 41 F8 FF FE

D3 F8 03 A5 85 32 53 25 88 F6 A8 97 76 B7 87 76

A7 30 44 F8 07 A5 88 FA 10 3A 68 97 FE A7 97 7E

B7 88 7E A8 25 85 3A 56 85 FE FE FE FE FE 51 97

A7 88 F4 B7 D3 FF FF FF FF FF FF FF FF FF FF FF $A480.

FF FF FF FF FF FF FF FF FF FF FF FF FF FF FF FF
FF FF FF FF FF FF FF FF FF FF FF FF FF FF FF FF
FF FF FF FF FF FF FF FF FF FF FF FF FF FF FF FF
FF FF FF FF FF FF FF FF FF FF FF FF FF FF FF FF
FF FF FF FF FF FF FF FF FF FF FF FF FF FF FF FF
FF FF FF FF FF FF FF FF FF FF FF FF FF FF FF FF
FF FF FF FF FF FF FF FF FF FF FF FF FF FF FF FF $A500.

D2 07 09 F8 0B A6 F8 20 B6 C0 10 44 FF FF FF FF
D2 07 09 F8 0B A6 F8 20 B6 C0 11 9D FF FF FF FF
FF FF FF FF FF FF FF FF FF FF FF FF FF FF FF FF
FF FF FF FF FF FF FF FF FF FF FF FF FF FF FF FF
FF FF FF FF FF FF FF FF FF FF FF FF FF FF FF FF
FF FF FF FF FF FF FF FF FF FF FF FF FF FF FF FF
FF FF FF FF FF FF FF FF FF FF FF FF FF FF FF FF
FF FF FF FF FF FF FF FF FF FF FF FF FF FF FF FF $A580.

FF FF FF FF FF FF FF FF FF FF FF FF FF FF FF FF
FF FF FF FF FF FF FF FF FF FF FF FF FF FF FF FF
FF FF FF FF FF FF FF FF FF FF FF FF FF FF FF FF
FF FF FF FF FF FF FF FF FF FF FF FF FF FF FF FF
FF FF FF FF FF FF FF FF FF FF FF FF FF FF FF FF
FF FF FF FF FF FF FF FF FF FF FF FF FF FF FF FF
FF FF FF FF FF FF FF FF FF FF FF FF FF FF FF FF
FF FF FF FF FF FF FF FF FF FF FF FF FF FF FF FF $A600.

FF FF FF FF FF FF FF FF FF FF FF FF FF FF FF FF
FF FF FF FF FF FF FF FF FF FF FF FF FF FF FF FF
FF FF FF FF FF FF FF FF FF FF FF FF FF FF FF FF
FF FF FF FF FF FF FF FF FF FF FF FF FF FF FF FF
FF FF FF FF FF FF FF FF FF FF FF FF FF FF FF FF
FF FF FF FF FF FF FF FF FF FF FF FF FF FF FF FF
FF FF FF FF FF FF FF FF FF FF FF FF FF FF FF FF

FF FF FF FF FF FF FF FF FF FF FF FF FF FF FF FF $A680,

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF $A700,

97 FA 1F B7 C0 03 AD FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF $A780,

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

FF FF FF FF FF FF FF FF FF FF FF FF FF FF FF FF

What is claimed is:

1. An on-line dielectric compensated level indicator system for determining the substance level within a container independently of changes in the dielectric constant of differing substances without probe span recalibration having a first and second capacitance probe positioned within the container, each with a respective zero capacitance when no substrate is in the container comprising:
   means for producing (1) a first time interval signal representative of the capacitance between the first probe and the container containing a substance and (2) a second time interval signal representative of the capacitance between the second probe and the container containing a substance thereby producing a probe span related to time and thus unlimited with respect to the magnitude of substance dielectric constant;
   control means including means for receiving the time interval signals and subtracting (1) a signal representative of the zero capacitance of the first probe from the first time interval signal for producing a first different signal and (2) a signal representative of the zero capacitance of the second probe from the second time interval signal for producing a second difference signal;
   ratio means for receiving the first and second difference signals from the subtracting means and determining the ratio of the first difference signal to the second difference signal for producing a signal representative of the substance level independently of the dielectric constant of the substance; and
   scaling means responsive to the ratio means for producing from the ratio of the first and second difference signals a signal representative of the level of substance within the container.

2. The on-line dielectric compensated level indicator system of claim 1 wherein the first probe is a measurement probe and the second probe is a reference probe.

3. The on-line dielectric compensated level indicator system of claim 1 in which the scaling means includes means for producing from the ratio of difference signals a signal representative of the percent fullness of the container.

4. The on-line dielectric compensated level indicator system of claim 1 including means for adding a zero offset to the ratio of difference signals.

5. The on-line dielectric compensated level indicator system of claim 1 wherein the means for producing the first and second time interval signals includes:
   switching means electrically connected to the probes for producing at an output a single signal alternately representative of the capacitance of the first probe and the capacitance of the second probe; and
   single transmission channel means connected to the switching means output for transmitting the single signal produced by the switching means over a single transmission channel to said control means.

6. The on-line dielectric compensated level indicator system of claim 5 including separator means electrically connected to the single transmission channel for producing from the single signal transmitted a first time interval signal related to the capacitance of the first probe and a second time interval signal related to the capacitance of the second probe.

7. An on-line dielectric compensated level indicator system having a first and second capacitance probe positioned within a container for automatically calculating the substance level within the container as a function of a first capacitance between the first probe and the container and a second capacitance between the second probe and the container comprising:
   first astable means electrically connected to the first probe for producing a first signal having a frequency related to the first capacitance, second astable means electrically connected to the second probe for producing a second signal having a frequency related to the second capacitance;
   switching means for producing a single signal alternately representative of the first and second signals;
   single transmission channel means for transmitting the single signal over a single transmission channel;
   separator means for receiving and producing from the single signal a first time interval signal representative of the first signal and a second time interval signal representative of the second signal; and
   control means for determining the substance level as a function of the first and second time interval signals.

8. The on-line dielectric compensated level indicator system of claim 7 wherein the first probe is a measurement probe and the second probe is a reference probe.

9. The on-line dielectric compensated level indicator system of claim 7 wherein the switching means includes counting means electrically connected to the first and second astable means for alternately counting the pulses of the first and second signals for switching output state every time a count reaches a predetermined number for producing the single signal.

10. The on-line dielectric compensated level indicator system of claim 9 wherein said output is coupled to the transmission means for transmission over the single channel.

* * * * *